United States Patent
Snyder et al.

(10) Patent No.: US 9,429,340 B2
(45) Date of Patent: Aug. 30, 2016

(54) AIR PANEL TECHNOLOGY AND METHOD OF USE THEREOF

(71) Applicant: GLOBAL SOLAR WATER POWER SYSTEMS, INC., Poway, CA (US)

(72) Inventors: Mark E. Snyder, Poway, CA (US); Albert Clark Rich, Carmichael, CA (US)

(73) Assignee: Global Solar Water Power Systems Inc., Poway, CA (US)

( * ) Notice: Subject to any disclaimer, the term of this patent is extended or adjusted under 35 U.S.C. 154(b) by 397 days.

(21) Appl. No.: 13/916,428

(22) Filed: Jun. 12, 2013

(65) Prior Publication Data

US 2014/0209090 A1    Jul. 31, 2014

Related U.S. Application Data

(60) Provisional application No. 61/658,857, filed on Jun. 12, 2012.

(51) Int. Cl.
| | |
|---|---|
| F24J 2/20 | (2006.01) |
| F24J 2/40 | (2006.01) |
| F24J 2/46 | (2006.01) |
| F24J 2/51 | (2006.01) |

(52) U.S. Cl.
CPC *F24J 2/20* (2013.01); *F24J 2/402* (2013.01); *F24J 2/4647* (2013.01); *F24J 2/51* (2013.01); *Y02B 10/20* (2013.01); *Y02E 10/44* (2013.01)

(58) Field of Classification Search
CPC .......... F24J 2/20; F24J 2/402; F24J 2/51; F24J 2/4647; Y02B 10/20; Y02E 10/44
See application file for complete search history.

(56) References Cited

U.S. PATENT DOCUMENTS 4,144,871 A * 3/1979 Porter .................. F24J 2/0494
126/674

* cited by examiner

*Primary Examiner* — Alfred Basichas
(74) *Attorney, Agent, or Firm* — Foley & Lardner LLP

(57) ABSTRACT

A device for using solar energy to heat air. The device can include a hot air panel having a box. The box can include a glazing, a collection plate, and a base layer. The collection plate can be disposed between the glazing and the base layer so as to define a first chamber and a second chamber. The first chamber can be an insulation chamber that can hold air within the box. The second chamber can be a flow chamber that allows air to flow through the box. The box can be further associated with a temperature detection device and a fan.

12 Claims, 5 Drawing Sheets

AIR PANEL TECHNOLOGY AND METHOD OF USE THEREOF

CROSS REFERENCE RELATED APPLICATIONS

This application claims priority to U.S. Provisional Application No. 61/658,857, filed Jun. 12, 2012, entitled A HOT AIR PANEL AND METHOD OF USE THEREOF, which is hereby incorporated herein by reference in its entirety. Any and all priority claims identified in the Application Data Sheet, or any correction thereto, are hereby incorporated by reference under 37 CFR 1.57.

BACKGROUND OF INVENTION

1. Field of the Invention

The present application relates to heating of air using solar energy, and devices for heating air with solar energy.

2. Description of the Related Art

The collection of solar energy is used to heat water, air, and to generate electrical current. Hot air panels are designed to effectively harness solar power to heat air for uses including, for example, the heating of buildings, or any other application that benefits from heated air.

Current hot air panels rely on a single chamber design, including a single air chamber located under a glazing and having an inlet and an outlet. Thus, solar energy collected by the hot air panel heats air within a single chamber of the hot air panel. Further developments are disclosed herein, which can permit solar energy to become widespread in the application of heating air.

SUMMARY OF THE INVENTION

Some embodiments relate to a hot air panel and specifically to a hot air panel including two chambers. In some embodiments, the hot air panel can include, for example, a glazing. The glazing can comprise a variety of materials in a variety of shapes and sizes, and can be configured to allow solar energy to travel into the solar panel. In some embodiments, the hot air panel can further comprise a collection plate. The collection plate can be located within an area defined by the glazing and the walls of the solar panel. In some embodiments, the plate can be located so as to divide a single space into an upper portion and a bottom portion. These portions can be sealed from each other so as to prevent air from flowing between the portions and to allow the flow of air in each portion independent of the other. In some embodiments, the hot air panel can further comprise an entrance hole, and an exit hole. In some embodiments, a fan can be associated with one of the entrance holes and/or the exit holes. In some embodiments, a heat measuring device can be located in one of the entrance or the exit holes. In some embodiments, the hot air panel can be positioned so that the exit hole is disposed vertically above the entrance hole and the fan can be associated with the entrance hole. In some embodiments, the fan can pressurize the hot air panel and propel air through the hot air panel and out the exit hole. In some embodiments, the heat measuring device can be associated with the exit hole.

Some embodiments relate to methods of use of a hot air panel. In some embodiments, a hot air panel can be used to heat air. In such embodiments, the hot air panel can collect solar energy to heat air within the hot air panel.

Some embodiments relate to methods of using a hot air panel to cool air. In such embodiments, the hot air panel can be positioned out of direct sunlight. In some embodiments, diurnal swings can result in external temperature differences which can affect the temperature of the hot air panel, and the air within the hot air panel. These diurnal swings can allow the hot air panel to be used as a heat exchanger to cool air within the hot air panel.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the devices and/or processes and/or other subject matter described herein will become apparent in the teaching set forth herein. The summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 4A depicts a cross-sectional view of the air panel; FIG. 4B depicts a top view of the air collector of FIG. 4A; and FIG. 4C depicts a front side view of the sheet metal absorber of FIG. 4A.

DETAILED DESCRIPTION OF THE PREFERRED EMBODIMENT

Figure 1:
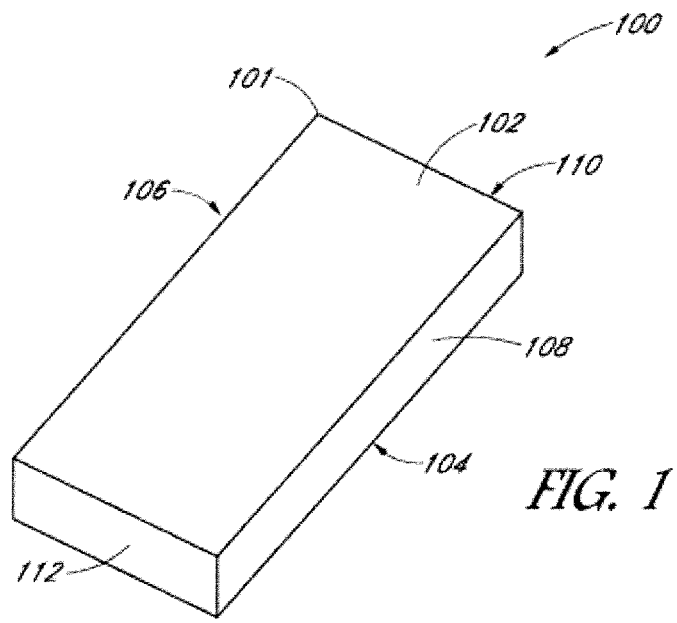
FIG. 1 depicts one embodiment of a hot air panel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The hot air panel described herein provides for improved heating of air within the hot air panel. In some embodiments, the hot air panel can be divided into a first chamber and into a second chamber. In some embodiments, the first chamber can be an insulating chamber and can, for example, retain a volume of air. In some embodiments, the second chamber can be a flow chamber. In some embodiments, the flow chamber can be configured for airflow through the chamber. Specifically, the flow chamber can be configured to allow the flow of air through the hot air panel to allow heating of air to a desired temperature, or to allow a desired rate of air flow through the hot air panel. In some embodiments, the hot air panel can be further configured with an entrance hole and an exit hole. In some embodiments, the entrance hole can be configured to allow air to flow into the hot air panel, and the exit hole can be configured to allow air to flow out of the hot air panel. In some embodiments, one or both of the entrance and exit holes can be associated with a fan. In one specific embodiment, the entrance hole can be associated with a fan that can, for example, pressurize the hot air panel and push air through the hot air panel. In some embodiments, one or both of the entrance and/or exit holes can be associated with a temperature detector. In some embodiments, the exit hole can be associated with a temperature detector. In one specific embodiment in which the hot air panel is so configured and/or positioned such that the exit hole is located at a height vertically above the entrance hole, the fan can be associated with the entrance hole and the temperature detector can be associated with the exit hole. Thus, the temperature detector can be located vertically above the fan.

The Hot Air Panel

FIG. 1 depicts one embodiment of a hot air panel 100. The hot air panel 100 can be configured to collect solar energy to heat air within the hot air panel 100. In some embodiments, for example, the hot air panel 100 can be configured to allow a volume of air to flow through the hot air panel 100 to allow the heating and/or cooling of that air. As depicted in FIG. 1, the hot air panel comprises a box 101. The box 101 can comprise a variety of features and can be a variety of shapes and sizes. In some embodiments, the box 101 can include features configured to facilitate the collection of solar energy and to facilitate heat transfer to air flowing through the hot air panel 100. In some embodiments, the box 101 can comprise sides defining an internal volume. In some embodiments, these sides can be rectangular, triangular, hexagonal, pentagonal, or have any other desired shape.

The box can comprise a variety of sizes. In some embodiments, for example, in which the box 101 is rectangularly shaped, the box 101 can have one or several dimensions each of which can be approximately 1,000 feet, 500 feet, 100 feet, 50 feet, 10 feet, 5 feet, one foot, six inches, three inches, one inch, ½ inch, ¼ inch, or any other desired or intermediate length. As depicted in FIG. 1, the box 101 can comprise a length of 240 inches, 200 inches, 160 inches, 120 inches 100 inches, 75 inches, 50 inches, 25 inches, 10 inches, 5 inches, 1 inch, 0.5 inches, 0.1 inches, or any other desired or intermediate dimension. In some embodiments, the box 101 can comprise a width of 240 inches, 200 inches, 160 inches, 120 inches 100 inches, 75 inches, 72 inches 50 inches, 25 inches, 10 inches, 5 inches, 1 inch, 0.5 inches, 0.1 inches, or any other desired or intermediate dimension. In some embodiments, the box 101 can have a height of 240 inches, 200 inches, 160 inches, 120 inches 100 inches, 75 inches, 50 inches, 25 inches, 10 inches, 5 inches, 1 inch, 0.5 inches, 0.1 inches, or any other desired or intermediate dimension.

As also seen in FIG. 1, the box can comprise a variety of faces and sides. As specifically depicted in FIG. 1, the box 101 can comprise a front 102, a back 104, a first side 106, a second side 108, a top 110, and a bottom 112. As depicted in FIG. 1, the front 102 is opposite the back 104. Similarly, and as depicted in FIG. 1, the first side 106 is opposite the second side 108, and the top 110 is opposite the bottom 112. In some embodiments, opposite sides and/or faces of the box 101 can comprise the same or different dimensions. In some embodiments, opposite sides and/or faces of the box 101 can comprise the same or different shapes. In some embodiments, opposite sides of the box 101 can be made of the same or different materials, having the same or different dimensions. Similarly, in some embodiments of the hot air panel 100, the opposite sides and/or faces of the box 101 can be parallel and/or nonparallel.

Figure 2:
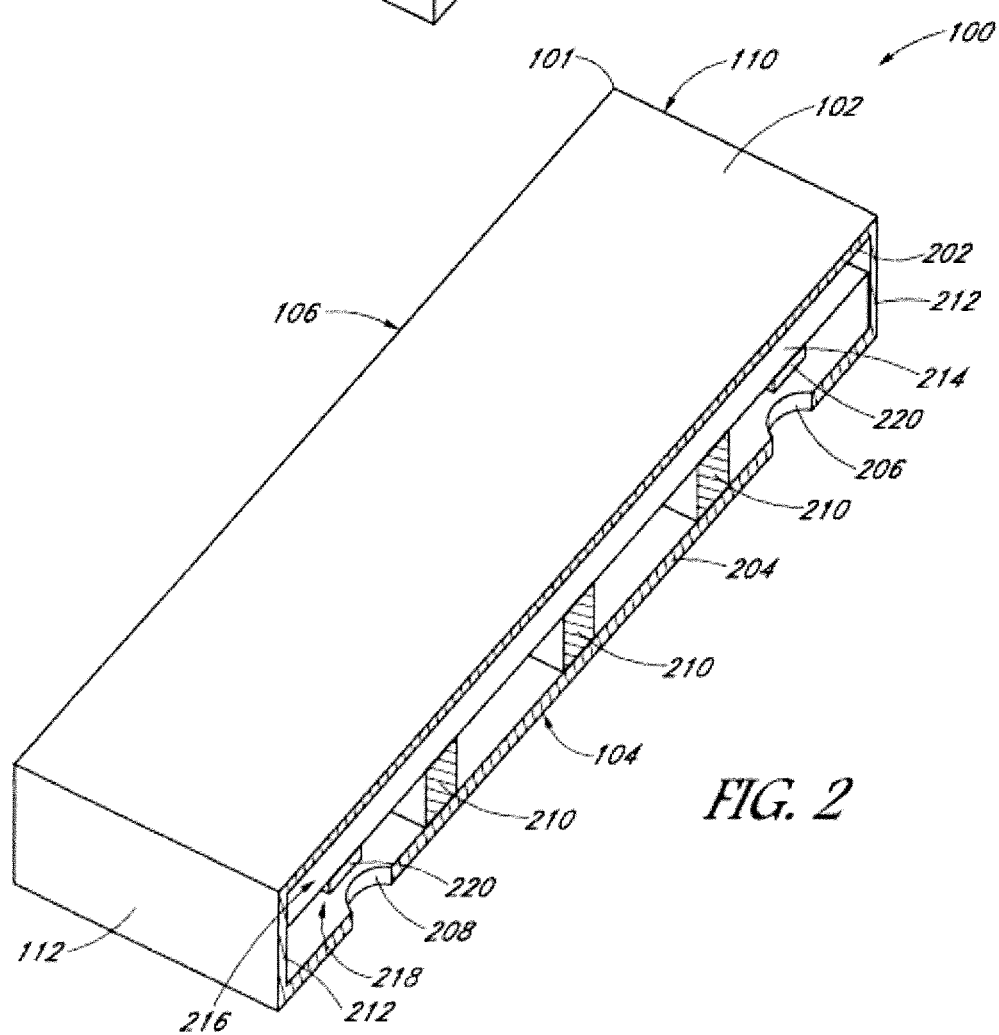
FIG. 2 depicts a perspective section view of one embodiment of a hot air panel.

FIG. 2 is a perspective, cutaway view of one embodiment of a hot air panel 100. As seen in FIG. 2, the hot air panel 100 comprises a box 101. Although not all the faces and/or sides of the box 101 are visible in FIG. 2, due to the cutaway portion of the box 101, the front 102, the back 104, the first side 106, the top 110, and the bottom 112 are visible in FIG. 2.

Due to the cutaway view shown in FIG. 2, the internal components of the box 101 are visible.

As seen in FIG. 2, the box 101 of the hot air panel 100 comprises a glazing 202. The glazing 202 can comprise a variety of shapes and sizes, and can be made from a variety of materials. In some embodiments, for example, the glazing 202 can be configured to allow solar energy to enter into the box 101. In some embodiments, the glazing 202 can be further configured to help maintain heat within the box 101.

The glazing 202 can be made from a variety of materials. In some embodiments, the glazing 202 can comprise, for example, a natural material, a man-made material, a synthetic material, a polymer, or any other material that allows solar energy to enter into the box 101. In one embodiment, for example, the glazing 202 can comprise a polycarbonate glazing, and in one specific embodiment, for example, the glazing 202 can comprise a polycarbonate twin glazing.

As also seen in FIG. 2, in some embodiments, for example, the glazing 202 can comprise the front 102 of the box 101. The glazing 202 can, in some embodiments, connect with and/or join with the first side 106, the second side 108, the top 110, and the bottom 112.

As seen in FIG. 2, the box 101 can further comprise a base layer 204. The base layer 204 can be located at the back 104 of the box 101. The base layer 204 can connect, at its boundaries, with the first side 106, the second side 108, the top 110, and the bottom 112 of the box 101. In some embodiments, the base 204 can be configured to seal with the first side 106, the second side 108, the top 110, and the bottom 112 of the box 101 to facilitate in defining a volume within the hot air panel 100.

The base 204 can comprise a variety of materials, and can, for example, comprise a plurality of materials. In some embodiments, for example, the base can comprise a natural material, a synthetic material, metal, wood, polymer, or any other desired material. In some embodiments, the base 204 can comprise an outer shell. The outer shell can be, for example, a metal such as aluminum. In some embodiments, the outer shell can provide structural integrity to the box 101, can support the base layer 204, and can protect the internal components of the box 101. In some embodiments, the base layer 204 can further comprise an insulating layer. In some embodiments, for example, the insulating layer can be any known or desired insulative materiel such as, for example, foam, fiberglass, or any other desired insulation. In one embodiment, for example, the insulating layer of the base layer 204 can comprise one-inch thick urethane foam.

In some embodiments, the box 101 of the hot air panel 100 can comprise one or several holes. In some embodiments, these holes can be configured to allow air to flow into and out of the hot air panel 100. These holes can be located in a variety of positions on the hot air panel 100. Further, these holes can be a variety of shapes and sizes. In some embodiments, for example, the holes can be circular, rectangular, triangular, or of any other desired shape. In some embodiments, for example, the holes can have one or several dimensions of 24 inches, 18 inches, 12 inches, 9 inches, 6 inches, 3 inches, 1 inch, 0.5 inches, 0.25 inches, or any other desired or intermediate dimension. A person of skill in the art will recognize that the present disclosure is not limited to a specific number, position, size, or shape of the holes.

Figure 2A:
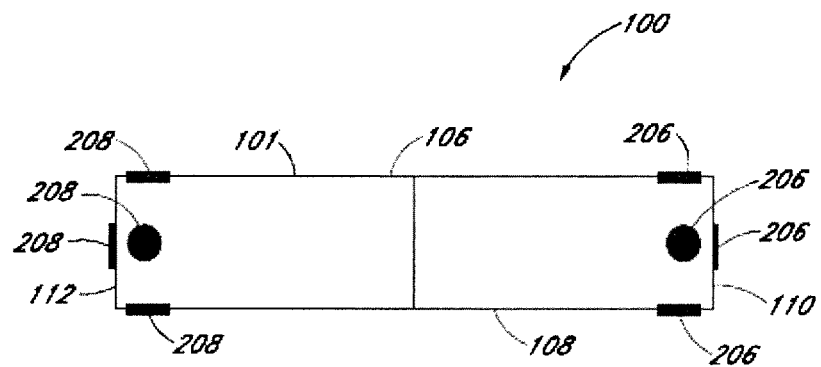
FIG. 2A depicts one embodiment of positioning of holes in a hot air panel.

FIG. 2A depicts another embodiment of the hot air panel 100. As seen in FIG. 2A, the hot air panel 100 comprises a box 101 having a first side 106, a second side 108, a top 110, and a bottom 112. FIG. 2A specifically illustrates that a box 101 of a hot air panel 100 can comprise holes such as the first hole 206 and the second hole 208 in a variety of locations. As specifically depicted in FIG. 2A, the first hole 206 can be located on the front 102, the back 104, the first side 106, the second side 108, or the top 110. As similarly shown in FIG. 2A, the second hole 208 can be located, for example, on the front 102, the back 104, the first side 106, the second side 108, and/or the bottom 112. A person of skill in the art will recognize that the holes, including the first hole 206, and the second hole 208, can be located in any desired position on the box 101 of a hot air panel 100.

The hot air panel 100 depicted in FIG. 2 comprises a first hole 206 and a second hole 208. The first hole 206 and the second hole 208 depicted in FIG. 2 are located in the base layer 204 and comprise circular holes. In some embodiments, air can flow into the hot air panel 100 through the first hole 206 and out of the hot air panel 100 through the second hole 208. In some embodiments, the direction of air flow can be, for example, reversed.

FIG. 2 further depicts a plurality of spacing blocks 210. The spacing blocks can comprise a variety of shapes and sizes and can be made from a variety of materials. In some embodiments, the spacing blocks 210 can be circular, rectangular, triangular, or any other shape. In some embodiments, the spacing blocks 210 can have a dimension of 24 inches, 18 inches, 12 inches, 9 inches, 6 inches, 3 inches, 1 inch, 0.5 inches, 0.25 inches, or any other desired or intermediate dimension. In some embodiments, the spacing blocks 210 can comprise a rectangular prism having a height of 0.75 inches, a width of 0.75 inches, and a length of 1 inch.

In some embodiment, the spacing blocks 210 can be configured to support portions of the hot air panel 100. As depicted in FIG. 2, the spacing blocks 210 are located on top of the base layer 204. In some embodiments, the spacing blocks 210 can be integrally formed with the base layer 204, and in some embodiments, for example, the spacing blocks 210 can be unconnected with the base layer 204. In some embodiments, for example, the spacing blocks 210 can comprise the same materials as base layer 204 or a different material from the base layer 204. Thus, in some embodiments, the spacing blocks 204 can comprise foam such as, for example, a urethane foam covered with aluminum tape.

Although FIG. 2 depicts three spacing blocks 210 located in the box 101 of the hot air panel 100, a person of skill in the art will recognize that the number, size, and position of the spacing blocks can vary based on the needs of the specific application. Thus, in some embodiments in which support of further components of the box 101 is required, a person of skill in the art could create an embodiment having more or larger spacing blocks 210. A person of skill in the art will further recognize that the material from which the spacing blocks 210 are made can, for example, depend on the specific requirements of the application in which the spacing blocks are being used.

As further depicted in FIG. 2, the box 101 of the hot air panel 100 can comprise one or several walls 212. As specifically depicted in FIG. 2, the walls 212 are located at the top 110, and the bottom 112 of the box 101. Although not visible in FIG. 2, walls 212 can be further located at the first side 106 and the second side 108. The walls 212 can comprise a variety of shapes and sizes and can be made from a variety of materials. In some embodiments, the walls can be configured to seal with the glazing 202 and with the base layer 204 to create a substantially airtight box 101. In some embodiments, the walls 212 can be configured to seal with the glazing 202 and with the base layer 204 to create a substantially airtight box 101 except for the first hole 206 and the second hole 208 located in the box 101.

In some embodiments, the walls 212 can be configured to facilitate in supporting portions of a box 101 such as, for example, the glazing, and can be configured to further segregate air located within the box 101 from air outside the box. In some embodiments the walls 212 can comprise an external shell made from a metal such as aluminum. In some embodiments, the walls 212 can further comprise an insulating layer of any desired thickness, dimensions, or made of any desired material. In one specific embodiment, this insulating layer can be 3 inches thick, 2 inches thick, 1 inch thick, 0.5 inches thick, 0.25 inches thick, 0.1 inches thick, or have any other desired or intermediate thickness. In one specific embodiment, for example, the insulating layer can comprise 0.5 inch thick foam such as 0.5 inch thick urethane foam.

As further depicted in FIG. 2, the box 101 includes a collection plate 214. As specifically depicted in FIG. 2, the collection plate can be disposed between the front 102 and the back 104 of the box 101. Thus, the collection plate 214 can be disposed between the glazing 202 and the base layer 204. As further depicted in FIG. 2, the collection plate 214 can contact the walls 212 of the box 101. By being disposed between the base layer 204 and the glazing 202, the collection plate 214 can divide the internal volume of the box 101 into an insulating chamber 216 and a flow chamber 218.

In some embodiments, for example, the collection plate 214 can sealingly connect with the walls 212 to prevent the flow of air from the insulating chamber 216 to the flow chamber 218. As further depicted in FIG. 2, the collection plate 214 can rest on top of, and be supported by, for example, the spacing blocks 210. As further depicted in FIG. 2, for example, the collection plate 214 can rest on top of one or more end blocks 220. In some embodiments, the end blocks 220 can be similar to the spacing blocks 210, and the end blocks can be located on top of the base layer 204. In some embodiments, the end blocks 220 can comprise a variety of shapes, sizes, and materials that are configured to facilitate in the supporting of members and components within the box 101 of the hot air panel 100. In some embodiments, the end blocks 220 can comprise the same or similar sizes, shapes, and materials as the spacing blocks 210.

The collection plate 214 can comprise a variety of materials. In some embodiments, for example, the collection plate 214 can comprise a thin metal sheet, such as, for example, a thin aluminum sheet. In some embodiments, the collection plate 214 can comprise a variety of thicknesses. In some embodiments, the collection plate 214 can comprise a thickness of, for example, one inch, 0.5 inches, 0.4 inches, 0.3 inches, 0.2 inches, 0.1 inches, 0.05 inches, 0.04 inches, 0.035 inches, 0.027 inches, 0.025 inches, 0.01 inches, 0.001 inches, or any other thickness or intermediate thickness. In one specific embodiment, for example, the collection plate 214 can comprise a thickness of between approximately 0.27 inch, and 0.35 inch.

In some embodiments, the collection plate 214 can be configured to facilitate absorbing solar energy. In some embodiments, for example, the collection plate 214 can comprise a high absorptivity and a low emissivity. In some embodiments, for example, the collection plate 214 can be treated with, for example, a paint configured to increase its absorptivity and decrease its emissivity.

The collection plate 214 can be positioned and configured in some embodiments to divide the internal volume of the box 101 into the insulating chamber 216 and the flow chamber 218. As also discussed, the collection plate 214 can seal with the walls 212 to prevent the flow of air from the insulation chamber 216 to the flow chamber 218. In some embodiments, solar energy passes through the glazing 202 and contacts the collection plate 214. Solar energy collecting on the collection plate 214 warms the air in both the insulating chamber 216 and the flow chamber 218. Air can then be circulating through the flow chamber 218 as it is heated to a desired temperature.

Some embodiments of the hot air panel 100 can include, for example, a fan, and a temperature detection feature. In some embodiments, the fan can be configured to move air through the hot air panel 100. In some embodiments, the fan can be configured to suck air through the hot air panel 100, and in some embodiments, the fan can be configured to push air through the hot air panel 100. In some embodiments, the fan can be located proximate to one of the first hole 206 and the second hole 208. In some embodiments, the fan can be connected to circuitry to allow the control of the fan speed, and to turn the fan on or to shut the fan off. In some embodiments of the hot air panel 100, the fan is controlled based on hot air panel or other parameters such as, for example, a desired temperature for the output air, the temperature of the air in the hot air panel 100, or any other parameter.

A person of skill in the art will recognize that a variety of fans and connected control features can be used in connection with the hot air panel 100 and that the present disclosure is not limited to any specific fan or specific control features.

In some embodiments, the hot air panel 100 can include a temperature detection feature. In some embodiments, this feature can include, for example, a thermocouple, a thermometer, or any other type of temperature detector. In some embodiments, the temperature detection feature can be located in any position in the hot air panel 100 and can be, for example, located proximate to one of the first hole 206 and the second hole 208. In some embodiments, the temperature detection feature can be located at a hole in the hot air panel 100 that includes the fan, or that does not include the fan.

In some embodiments, the function of the hot air panel 100 can be affected by the flow through the hot air panel and the specific and relative positioning of the fan and the temperature detection feature. In some embodiments, for example, the hot air panel can be positioned so that the fan is associated with a hole that is positioned vertically below the hole associated with the temperature detection feature.

Surprisingly, it has been found, that the specific positioning of the fan relative to the first hole 206 and the second hole 208 and the dividing of the internal volume of the box 101 into an insulating chamber 216 and a flow chamber 218 increases the energy output of the hot air panel 100, and in some cases increases the energy output of the hot air panel 100 by up to approximately 50%.

Figure 3:
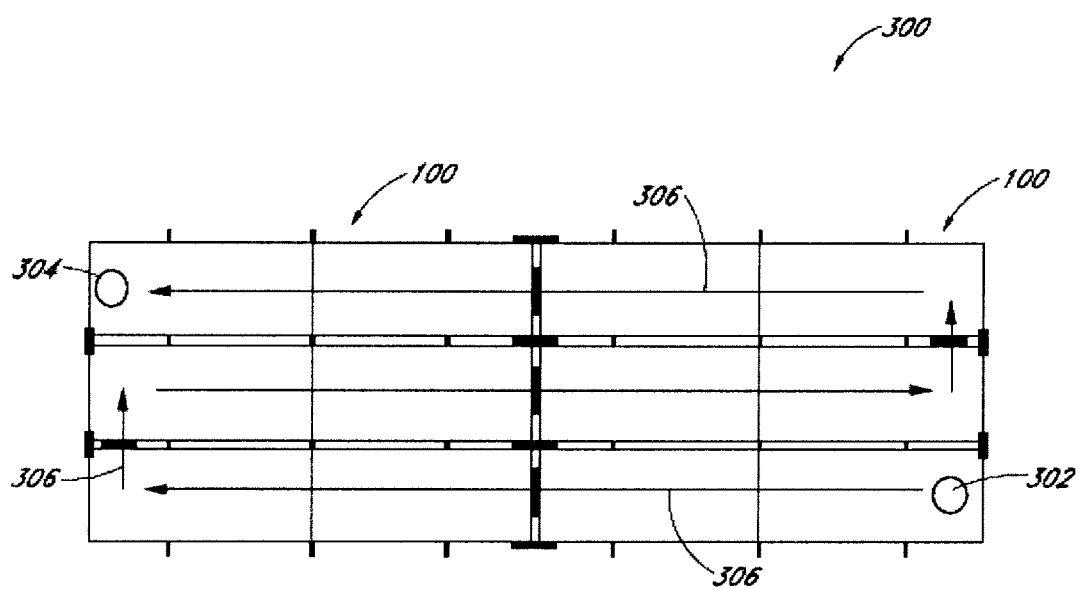
FIG. 3 depicts one embodiment in which a plurality of hot air panels are linked together in series.

FIG. 3 depicts one embodiment in which a plurality of hot air panels are joined together. In some embodiments, for example, a plurality of hot air panels 100 can be joined together to facilitate in heating of air. In some embodiments, the plurality of hot air panels 100 can be joined in parallel or be joined in series. In some embodiments, in which a plurality of hot air panels are joined in parallel, the total volume of air throughput through the plurality of hot air panels can be increased. In some embodiments in which hot air panels 100 are connected in series, the total change in temperature between air entering the hot air panels 100 and air exiting the hot air panels 100 can be increased. Thus, by connecting a plurality of hot air panels together in series, the exit temperature of the air can be increased. In some embodiments, a plurality of hot air panels 100 can be connected in both parallel and in series.

FIG. 3 depicts one embodiment in which six hot air panels 100 are connected in series. As depicted in FIG. 3, the plurality of hot air panels 300 have an entrance hole 302 and an exit hole. As also seen in FIG. 3, and as indicated by arrows 306, the air flows from the entrance hole 302 through the plurality of hot air panels 100 into the exit hole 304. A person of skill in the art will recognize that any number of hot air panels can be connected together based on the needs of the specific application, and that the present application is not limited to the specific number of hot air panels connected as shown in FIG. 3 or to any other number of hot air panels 100 connected together.

In some embodiments, the hot air panel 100 can be positioned so as to maximize the collection of solar energy, and to maximize the usefulness of the hot air panel. In some embodiments, the hot air panel 100 can be vertically positioned such that the glazing 202 and the base layer 204 are vertical and thus perpendicular to the surface of the earth. In some embodiments, for example, the hot air panel 100 can be positioned so as to receive the maximum value of solar energy during cold weather months in which hot air is desired, and to receive the minimum amount of direct solar energy during warm weather months in which hot air is not desired.

In some embodiments, the hot air panel 100 can be used in connection with a control system that can, for example, detect the temperature within the hot air panel such as by, for example, a temperature detection device located in the hot air panel such as, for example, in the flow chamber 218 of the hot air panel 100, and then, based on the temperature data collected from the hot air panel 100 determine whether or not, or at what rate to flow air through the hot air panel 100. In some embodiments, in which the hot air panel 100 is being used to cool air, the control system can determine when to flow air through the hot air panel based on when the temperature of the air and the flow chamber 218 is below a threshold temperature. A person of skill in the art will recognize that a variety of different parameters can be used to determine when and how quickly air should be flowed through the flow chamber 218 of the hot air panel. A person of skill in the art will further recognize the present disclosure is not limited to the specific details of control for the hot air panel 100.

Figure 4A:
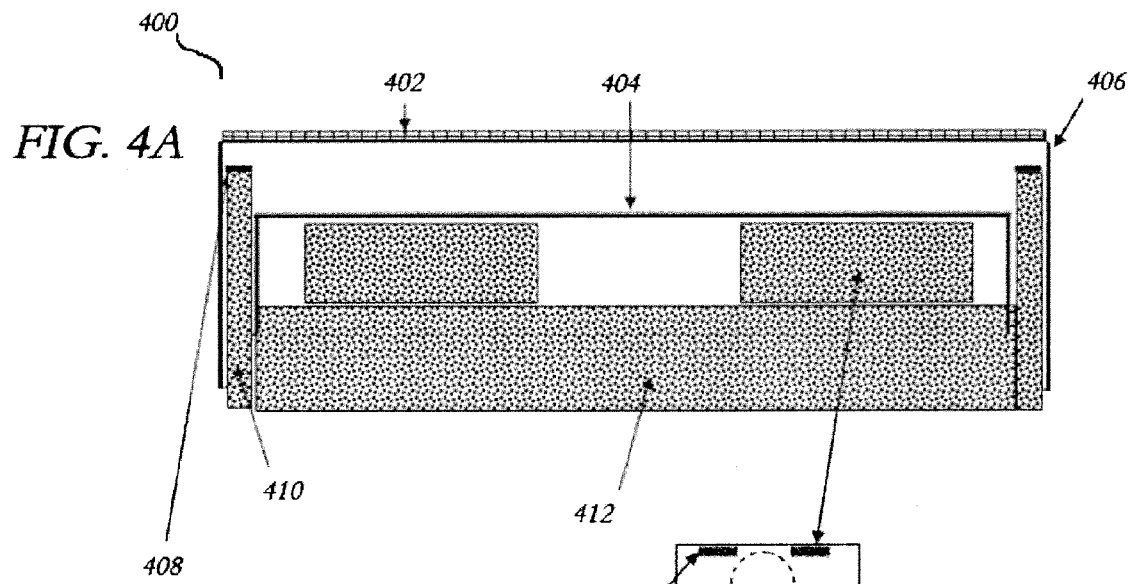
FIGS. 4A-4C depict various schematic views providing potential, non-limiting dimensions of one embodiment of a hot air panel. Particularly.
Figure 4B:
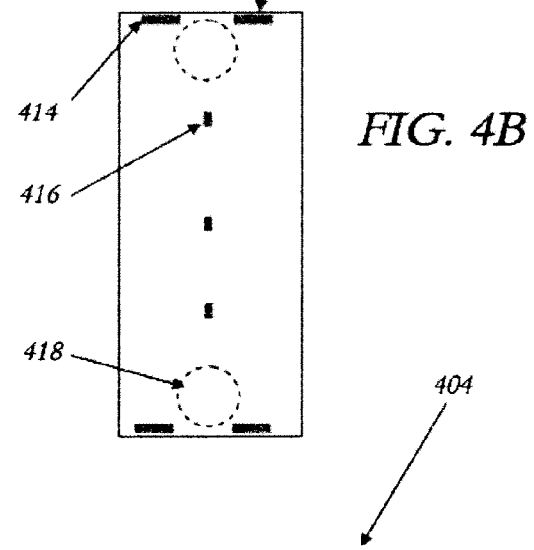
Figure 4C:
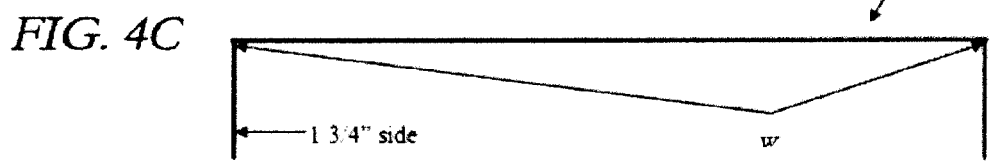

FIGS. 4A-4C depict various views of one embodiment of a hot air panel 400. In the illustration of FIG. 4A, the hot air panel 400 has a polycarbonate twin-wall glazing 402, an aluminum solar absorber 404, and a 20" wide roll formed aluminum frame 406. ⅛"×⅜" doublesided foam tape 408 is disposed between the twin-wall glazing 402 and the frame 406 with a ¹⁄₁₆'×¾" top and bottom EPDM seal over the glazing 402 top side of the frame 406 to seal against dust. A bead of Silicone completes the seal. The hot air panel 400 of FIG. 4A further includes ½" side Urethane Foam 410 on sides, top, and bottom and 1" bottom Urethane foam 412. As shown in FIG. 4B, in the illustrated embodiment, ¾"×¾"×4" aluminum taped spacing blocks 414 at far end of absorbers 404 leaves about ¾ of an inch air space between the absorber 404 and the glazing 402. Additionally, three 1" long by ¾" square aluminum taped Urethane Foam Absorber support blocks 416 are glued and taped to the top of the insulation board and absorber 404. Furthermore, 6" inlet and outlet air holes 418 are provided at the top and bottom of the collector for heat transfer into and out of the collector heat transfer air channel. Other air channel options include side slots that join to an adjacent collector. In the illustrated embodiment of FIG. 4C, the sheet metal absorber 404 is made of a 0.027-0.035 thick bent aluminum sheet treated and painted with semi-selective paint. In the depicted embodiment, the absorber 404 has a 1¾" side and a total width (w) of 19".

Figure 5:
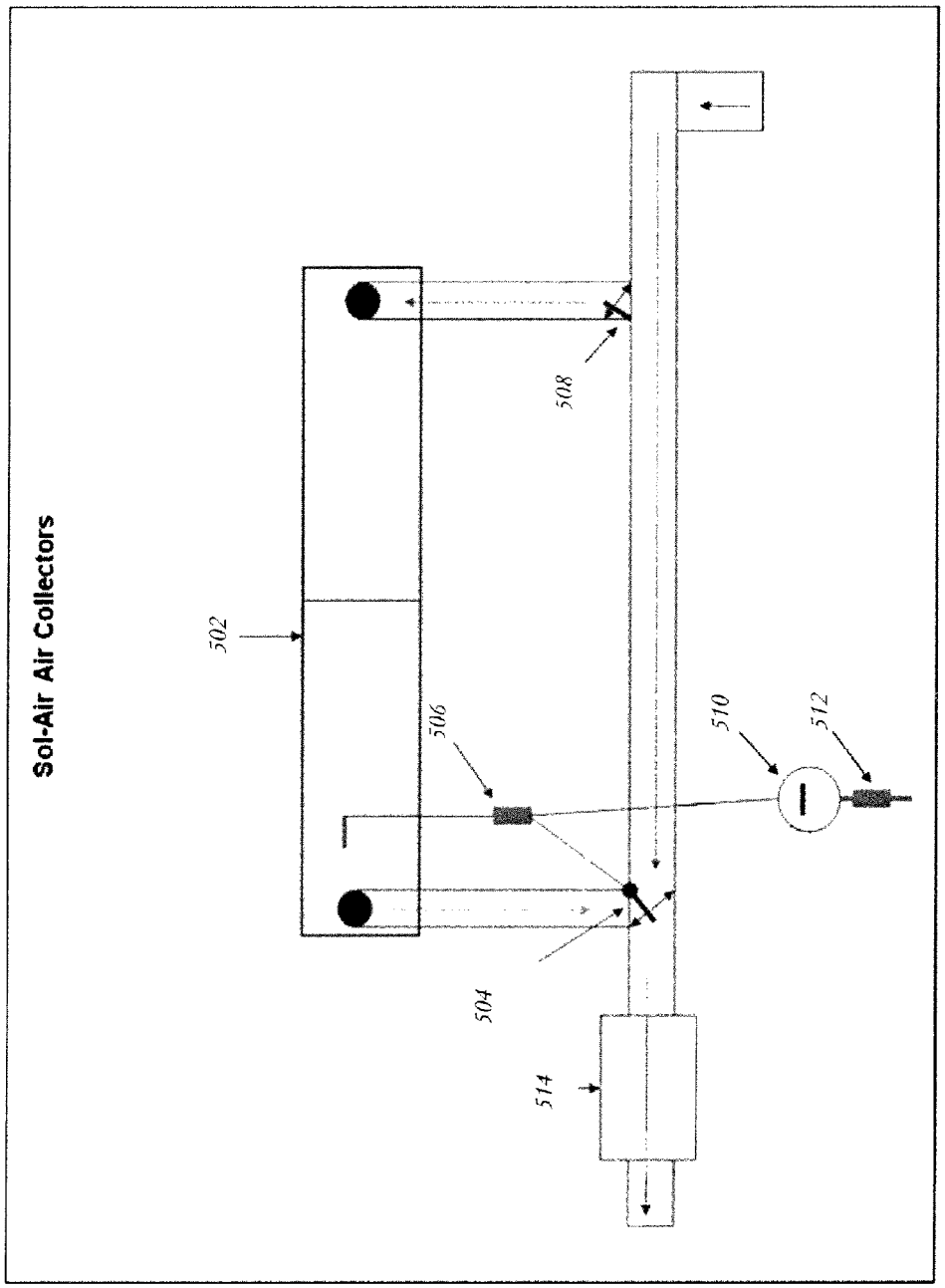
FIG. 5 schematically depicts one embodiment of a hot air panel as installed into an existing air plenum.

FIG. 5 schematically depicts one embodiment of a typical air collector installation into an existing air plenum. As depicted, in some embodiments the installation involves one or more Sol-Air 10-05 or 20-05 air collector(s) 502. A powered 24-volt diverter flap 504 is normally closed to the collector 502 and opens when heat is available in the collector 502. A bulb thermostat 506 (such as a Granger 4MY93) opens the powered diverter valve 504 when the collector exceeds a temperature normally set at 120 F. When the flap 504 opens, the backup heat source is deactivated while leaving the fan function on. Passive air flap 508 opens when air is drawn through the collector 502 and closes when air is bypassing the collector 502. The embodiment further includes a mercury switch thermostat 510 (such as a Granger 2E987), which will activate the bulb thermostat function so when heat is needed in the building and heat is available in the collector 502, the bulb thermostat 506 will open diverter flap 504 to the collector 502. A 24-volt transformer 512 powers the bulb thermostat 506 through the low voltage mercury switch thermostat 510. The depicted embodiment further includes an air handler 514 with backup heat source.

Figures 6, 7:
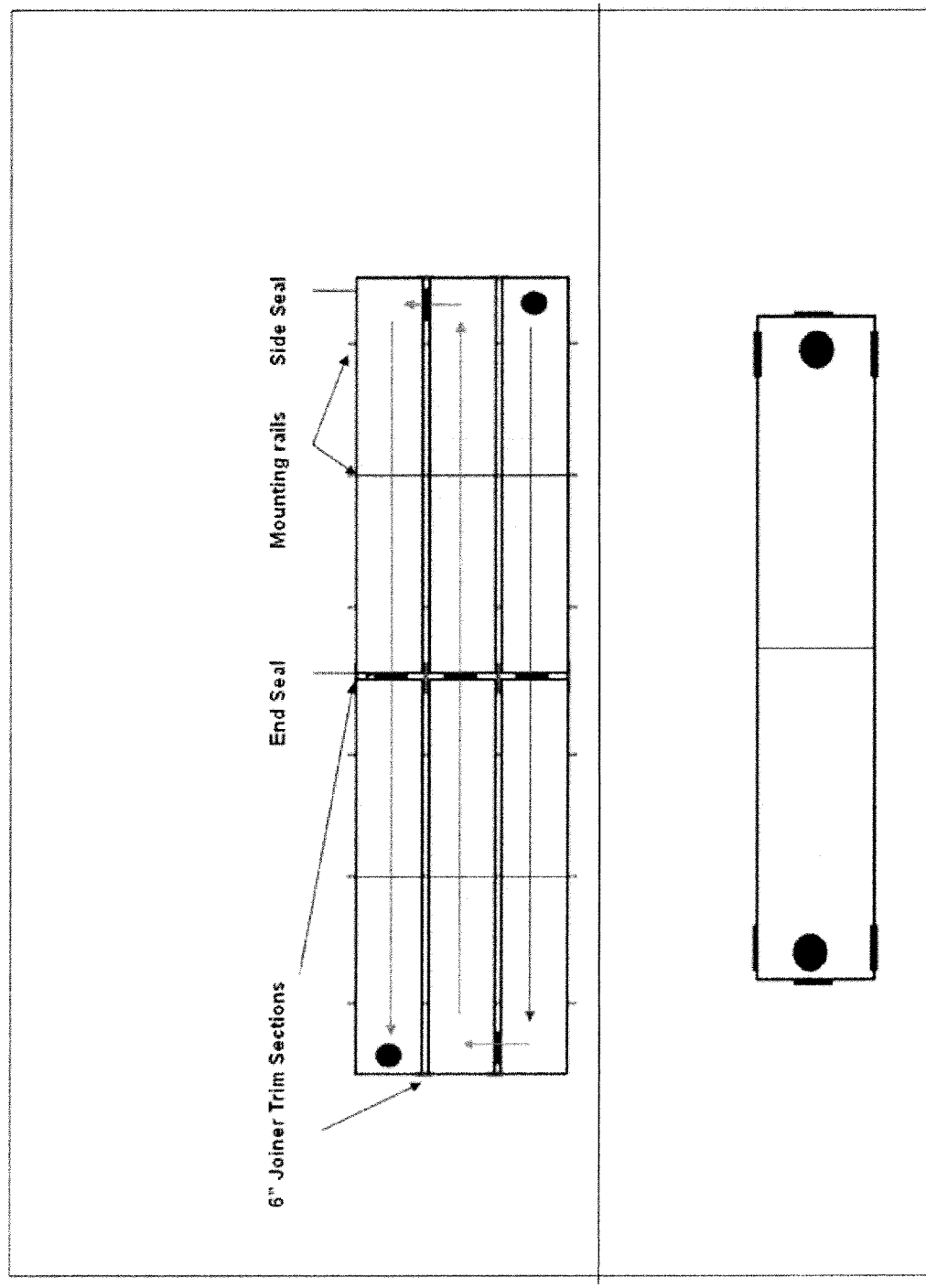
FIG. 6 depicts one embodiment of possible locations for the positioning of holes in a hot air panel.
FIG. 7 depicts one embodiment in which a plurality of hot air panels are linked together in series.

The diagram of FIG. 6 shows the possible cuts for holes and slots for hot air flow. Typically there need to be 2 cuts. It can be as simple as a hole on either end for a single pass or a combination of holes and slots on sides and ends as shown above. The standard hole size is 6" and slots are 1"×8".

In the embodiment of FIG. 7, a plurality of "Sol-Air" air collectors are shown in a six collector sample configuration. Rails, if used, are about 4" apart. Specifically, the illustrated diagram shows six Sol-Air air collectors set up in a 3×3 side by side configuration. In the actual installation, there is very little space between the collectors as the ½"×½" rubber sealing strips need to be squeezed tight between the collector sides or ends. 6" joiner trim sections are supplied to secure the collectors tight together where there are seals. The joiner sections are Tec screwed through the top or side.

Appendix A includes non-limiting additional and/or supplemental disclosure relating to various non-limiting embodiments of utility structures and components thereof.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

While various aspects and embodiments have been disclosed herein, other aspects and embodiments will be apparent to those skilled in the art. The various aspects and embodiments disclosed herein are for purposes of illustration and are not intended to be limiting.

APPENDIX A

The Panel includes:
1. A back channel deepened by ⅜ of an inch to allow for less resistance to air flow.
2. The absorber is a thin aluminum absorber sheet allowing for excellent heat transfer and lighter weight, and not black painted metal.
3. The side walls of the sheet are longer to give the proper air channel depth.
4. The sealing method is improved to seal out dust which can be a major problem in the high desert for example. The side walls and ends of the air collectors were sealed along the full length with a bead of silicone.
5. The ends of the absorber are supported to allow for decreased heat loss, more secure absorber support and a better air seal.
6. The "V" in the middle of the metal sheet causes IR restriction in certain configurations and has been eliminated. Its support and stiffening function has been replaced by 3 approximately ¾"square foam blocks that are coated with aluminum take and adhered to the absorber with automotive adhesive.
7. The insulation increased to a full 1" for the entire length of the collector. This eliminated tedious fitting of aluminum tape seals.
8. The aluminum absorber is scuffed, treated with vinegar and painted with a thin layer of a selective surface paint to increase performance by providing a lower emissivity of heat to the glazing.
9. The airways are super sealed to allow for a pressurized airway as opposed to a slight vacuum created by traditional suction air heater techniques.
10. The glazing to trim area is also super sealed to allow for use in highly dust prone areas. The two wall, UV treated Polycarbonate glazing open edge ends of the air collector are sealed with silicone on the outside to prevent any dust from getting into the glazing.
11. A unique concept of using the air collector to cool the living space area as well as heat was developed. This concept is very important in very dusty areas for quality of life and safety by nocturnally cooling the living space without introducing unhealthy dust, especially red dust that can contain dust mite as well as viruses, spores and so on. The Sol-Air module was very effectively used to cool at night using the Sol-Air as a heat exchanger. The elevations are 4,000 feet above sea level to 6,500 feet and the days in the summer are 100°-120° F. during the daytime and they drop seasonally to 50°-60° F. at night after 10:00 p.m. like clockwork. The Sol-Air can be run from 10:00 a.m.-4:00 p.m. depending on the cool of the night available. A simple change to a heating/cooling t-stat with a summer/winter switch and the system is automated to run when the temperature drops to a present level of 60°-65° F. The cool influence cools the EMPUS room first, then the home attached this system can be used to cool or heat any structure. This was an important and significant innovation no other solar thermal heating system is being dual used to heat and cool. This is very significant improvement from field testing in the summer of 2011 and is included in Model B of the Sol-Air.
12. A unique "air filter sock" was developed to allow for the introduction of dust free fresh are into the living space. A filtered air intake tube was added to provide make up air up to 10%-20% according to an adjustable damper opening. This is on the fan intake side.
13. The control system was changed and improved.
14. The air flow was switched to an induced air flow which resulted in a 50% improvement in hot air output. Optimize at 125-1315 cfm with t-stat at top. Daily output increased by 50%. This was a breakthrough for heating output maximization. Rather than waiting for heat to rise to 100°+ temps, we have immediate heat production at 75°-85° F. temps as soon as the run rises until sunset. This produces a steady heat production at 750 btu per hour at 0° F. temperature outdoors in full sun. Even with cloudy weather at sub zero temps we were producing 65° F. temps.
15. A highly flexible slotted air channel technique was developed and improved upon to allow for interconnecting collector airways thru the sides or ends of the collectors for increased performance and use in more demanding applications as well as connections to existing air plenums etc.
16. It was established the air inlet and outlet holes can be positioned to the sides where needed for tight spaces with very little effect on overall collector performance.

What is claimed is:

1. A hot air panel configured to heat air within the hot air panel using solar energy, the hot air panel comprising:
   a glazing configured to allow solar energy into the hot air panel and defining a top of the hot air panel;
   a base layer defining the bottom of the hot air panel, wherein the glazing and the base layer define in part a volume of the hot air panel;
   a collection plate positioned between the glazing and the base layer such that the collection plate divides the volume of the hot air panel into two portions that are isolated from each other, a first portion comprising a volume that is at least partially defined by the glazing and the collection plate, and a second portion comprising volume that is at least partially defined by the base layer and the collection plate; wherein
   the first portion comprises an insulating portion; and
   the second portion comprises a flow portion having an area defined by a width and a length; and
   a plurality of spacing blocks disposed in spaced within the second portion, each spacing block contacting from the base layer of the hot air panel to the collection plate; wherein each spacing block has a width less than the width of the second portion.

2. The hot air panel of claim 1, wherein the second portion comprises an entrance hole and an exit hole associated with the flow portion.

3. The hot air panel of claim 2, further comprising a fan and a temperature detection feature.

4. The hot air panel of claim 3, wherein the fan is configured to push air through the hot air panel.

5. The hot air panel of claim 3, wherein the fan is associated with the entrance hole and the temperature detection feature is associated with the exit hole.

6. The hot air panel of claim 5, wherein the entrance hole is vertically disposed below the exit hole.

7. The hot air panel of claim 2, wherein the second portion is enclosed by the base layer, the central plate, and one or more sides, such that the defined volume is enclosed therein, wherein the entrance hole and exit holes permit air to flow into and/or out of the second portion.

8. A method of cooling air with the hot air panel as recited in claim 1, the method comprising:
  positioning the hot air panel out of direct sunlight;
  circulating air through the panel when the in panel air temperature drops below a threshold level.

9. The hot air panel of claim 1, wherein the first portion is enclosed by the glazing, the central plate, and one or more sides, such that the defined volume is enclosed therein.

10. A plurality of hot air panels according to claim 1, joined together with each panel stacked together or each joined side-by-side together in a series.

11. The plurality of hot air panels according to claim 10, joined together in a series.

12. The plurality of hot air panels according to claim 10, stacked together in parallel.

\* \* \* \* \*